(12) United States Patent
Mao et al.

(10) Patent No.: US 12,265,987 B2
(45) Date of Patent: Apr. 1, 2025

(54) POSITION-BIAS CORRECTION FOR PREDICTIVE AND RANKING SYSTEMS

(71) Applicant: Microsoft Technology Licensing, LLC, Redmond, WA (US)

(72) Inventors: Jialiang Mao, Mountain View, CA (US); Rina Siller Friedberg, San Francisco, CA (US); Karthik Rajkumar, Palo Alto, CA (US); Qian Yao, Sunnyvale, CA (US); Min Liu, Palo Alto, CA (US); YinYin Yu, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/976,089

(22) Filed: Oct. 28, 2022

(65) Prior Publication Data
US 2024/0152955 A1   May 9, 2024

(51) Int. Cl.
*G06Q 30/0241* (2023.01)
*G06Q 30/0242* (2023.01)

(52) U.S. Cl.
CPC ..... *G06Q 30/0243* (2013.01); *G06Q 30/0277* (2013.01)

(58) Field of Classification Search
None
See application file for complete search history.

(56) References Cited

U.S. PATENT DOCUMENTS

| | | | |
|---|---|---|---|
| 10,497,012 B1* | 12/2019 | Majumder | G06N 7/01 |
| 2009/0265290 A1* | 10/2009 | Ciaramita | G06N 3/08 |
| | | | 706/12 |
| 2017/0177579 A1* | 6/2017 | Li | G06F 16/9535 |
| 2021/0319033 A1* | 10/2021 | Zhang | G06F 16/953 |
| 2022/0374483 A1* | 11/2022 | Hunt | H04L 67/55 |

OTHER PUBLICATIONS

F. Friedberg et al., "Causal Estimation of Position Bias in Recommender Systems Using Marketplace Instruments", cited in IDS (Year: 2022).*

(Continued)

*Primary Examiner* — Sam Refai
(74) *Attorney, Agent, or Firm* — Cantor Colburn LLP; Renee D. Brown

(57) ABSTRACT

Methods, systems, and computer programs are presented for eliminating bias while training an ML model using training data that includes past experimental data. One method includes accessing experiment results, for A/B testing of a first model, that comprise information regarding engagement with a first set of items presented to users, each item being presented within an ordered list of results. A position bias is calculated for positions within the ordered list of results where the items were presented. A machine-learning program is trained to obtain a second model using a training set comprising values for features that include the calculated position bias. The method includes detecting a second set of items to be ranked for presentation to a first user, and calculates, using the second model, a relevance score for the second set of items, which are ranked based on the respective relevance score and presented on a display.

20 Claims, 10 Drawing Sheets

(56) References Cited

OTHER PUBLICATIONS

"Ordered logit", Retrieved From: https://en.wikipedia.org/wiki/Ordered_logit, Retrieved on: Oct. 17, 2022, 3 Pages.

Narayanan, et al., "Position Effects in Search Advertising and their Moderators: A Regression Discontinuity Approach", In Journal of Marketing Science, vol. 34, Issue 3, May 1, 2015, pp. 388-407.

Agarwal, et al., "Estimating Position bias without Intrusive Interventions", In Proceedings of the Twelfth ACM International Conference on Web Search and Data Mining, Feb. 11, 2019, pp. 474-482.

Aggarwal, et al., "General Auction Mechanism for Search Advertising", In Conference of World Wide Web, Apr. 20, 2009, pp. 241-250.

Angrist, et al., "Identification of Causal Effects Using Instrumental Variables", In Journal of the American Statistical Association, vol. 91, Issue 434, Jun. 1996, pp. 444-455.

Athey, et al., "Generalized Random Forests", In Repository of arXiv:1610.01271v4, Apr. 5, 2018, pp. 1-49.

Craswell, et al., "An Experimental Comparison of Click Position-Bias Models", In Proceedings of the International Conference on Web Search and Data Mining, Feb. 11, 2008, pp. 87-94.

Friedberg, et al., "Causal Estimation of Position Bias in Recommender Systems Using Marketplace Instruments", In Repository of arXiv:2205.06363v1, May 12, 2022, pp. 1-17.

Wang, et al., "Position bias Estimation for Unbiased Learning to Rank in Personal Search", In Proceedings of the Eleventh ACM International Conference on Web Search and Data Mining, Feb. 5, 2018, pp. 610-618.

Joachims, et al., "Unbiased Learning-to-Rank with Biased Feedback", In Proceedings of the Tenth ACM International Conference on Web Search and Data Mining, Feb. 2017, pp. 781-789.

Li, et al., "Handling Position Bias for Unbiased Learning to Rank in Hotels Search", In Repository of arXiv:2002.12528v1, Feb. 28, 2020, pp. 1-7.

Pandey, et al., "Shuffling a Stacked Deck: The Case for Partially Randomized Ranking of Search Engine Results", In Repository of arXiv:cs/0503011v1, Mar. 4, 2005, 25 Pages.

Rosenman, et al., "Designing Experiments Informed by Observational Studies", In Journal of Causal Inference, Jul. 15, 2021, pp. 147-171.

Swaminathan, et al., "Counterfactual Risk Minimization: Learning from Logged Bandit Feedback", In Proceedings of the 32nd International Conference on Machine Learning, Jul. 6, 2015, 10 Pages.

\* cited by examiner

FIG. 5

POSITION-BIAS CORRECTION FOR PREDICTIVE AND RANKING SYSTEMS

TECHNICAL FIELD

The subject matter disclosed herein generally relates to methods, systems, and machine-readable storage media for correcting the bias created when items are placed in more favorable positions within a display feed.

BACKGROUND

Information-retrieval systems, such as online marketplaces, news feeds, and search engines, facilitate information discovery by ranking retrieved items based on predicted relevance, e.g., likelihood of interaction of the user with the retrieved item (e.g., a click, a share). Typically modeled using past interactions, such rankings have a major drawback: the interaction depends on the attention items receive. A high-relevance item placed outside a user's attention could receive little interaction, while a low-relevance item may receive more interaction while being presented on a favorable position towards the top of the webpage. This discrepancy between observed interaction and true relevance is termed position bias or position effect. The position bias degrades relevance estimation and, when compounded over time, the position bias can silo users into being presented with non-relevant items.

The position bias may be identified with randomized experiments, but such an approach can be prohibitive in cost and feasibility. Further, past research has also suggested propensity score methods, which do not adequately address unobserved confounding, and regression discontinuity designs, which have poor external validity.

For example, in online marketplaces for ads, the amount charged for ads is usually proportional to its relevance, but incorrect relevance estimates may lead to overcharging advertisers or to revenue loss because of lack of engagement. An accurate estimate of the position bias is thus extremely useful for service providers that provide information-retrieval systems.

BRIEF DESCRIPTION OF THE DRAWINGS

Various of the appended drawings merely illustrate example embodiments of the present disclosure and cannot be considered as limiting its scope.

FIG. 5 is a people-you-may know (PYMK) user interface for recommending new social connections to a user of an online service, according to some example embodiments.

DETAILED DESCRIPTION

Figure 1:
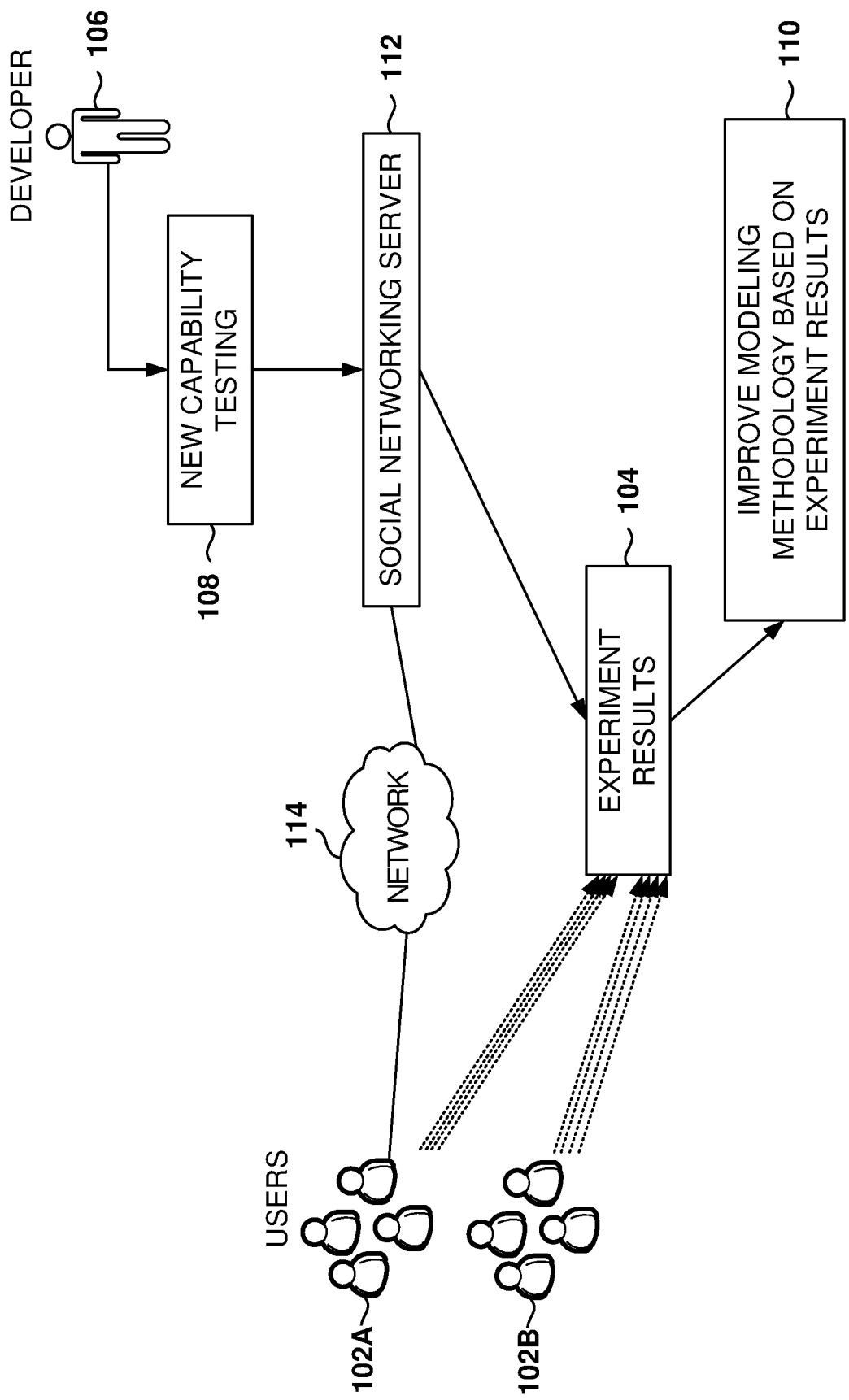
FIG. 1 illustrates the testing of new models, according to some example embodiments.

Example methods, systems, and computer programs are directed to eliminating bias while training a machine-learning (ML) model using training data that includes past experimental data. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A straightforward test for bias in ranking would be to place items in different locations of a sorted list of results, and then capturing the interactivity of users according to the locations. However, live systems may not allow this type of testing because placing items in the "wrong" location will likely affect revenue collected. For example, placing low-relevant ads high in the list of results will result in fewer user clicks, which means less revenue for the platform.

In one aspect, the results from previous A/B testing for ranking models are used to identify bias. For example, a new version of a ranking algorithm is tested using A/B testing, that is, testing different versions of the ranking algorithm on different sets of users. The different ranking algorithms will rank items differently, and the user responses are utilized to calculate bias based on the different locations of the items. By leveraging results from previous tests, the system does not jeopardize the revenue stream by placing items without regard to relevance.

In one aspect, a method is presented to define a way to quantify the position effect at different positions under machine-learning (ML) models trained with historical data. The method includes defining a model-based way to correct for position effects on top of the predicted levels of interaction (e.g., predicted click-through rates (CTR)). The method is generic and can be applied to most information retrieval systems. Some embodiments are described with reference to ad-delivery and people-you-may know (PYMK) systems, but the same principles may be utilized for other ranking systems. The proposed embodiments provide a novel model-based approach to estimate the position effect leveraging past experiments.

The advantages of the proposed techniques include no intrusive interventions that may hurt users' or advertisers' experience, guarantee of unbiasedness with testable assumptions, relatively low engineering cost to implement, and robustness for the underlying information retrieval system.

One general aspect includes a method that includes an operation for accessing experiment results for A/B testing of a first model. The experiment results comprise information regarding user engagement with a first plurality of items when the items are presented to users, each item being presented within an ordered list of results. The method further includes calculating, based on the experiment results, a position bias for positions within the ordered list of results where the items were presented to the users. A machine-learning program is trained to obtain a second model, where the training uses a training set comprising values for a plurality of features that include the calculated position bias. The method further includes operations for detecting a second plurality of items to be ranked for presentation to a first user, and for calculating, using the second model, a relevance score for each of the second plurality of items. The second plurality of items are ranked based on the respective relevance score, and the ranked second plurality of items are presented on a display.

For the purposes of this description the phrases "an online social networking application" and "an online social network system" may be referred to as and used interchangeably with the phrases "an online system," "an online service," "a networked system," or merely "a connections network." It will also be noted that a connections network may be any type of an online network, such as, e.g., a professional network, an interest-based network, or any online networking system that permits users to join as registered members. For the purposes of this description, registered members of a connections network may be referred to as simply members or users, and some unregistered users may also access the services provided by the online service. As used herein, a "user" refers to any person accessing the service, either registered or unregistered. Further, some connections networks provide services to their members (e.g., search for jobs, search for candidates for jobs, job postings) without being a social network, and the principles presented herein may also be applied to these connection networks.

FIG. 1 illustrates the testing of new models, according to some example embodiments. In one scenario, a developer 106 creates a new feature or capability for the online service, e.g., testing a new scoring model used for ranking. The developer 106 performs testing 108 of the new capability by adding the new capability to the online service provided by a social networking server 112 and testing the new capability using A/B testing, where A users 102A are exposed to the previous model and B users 102B are exposed to the new model. The users 102A, 102B access the social networking server using a network 114, such as the Internet.

The new feature is tested over a period of time (e.g., two weeks) and experiment results 104 are captured. However, experiment bias, also referred to as engagement bias, is often found in the experiment results 104 because items located in better locations in the results' list tend to obtain better engagement from users because of enhanced visibility. The experiment results 104 are used to improve 110 modeling methodology to eliminate the position bias.

Oftentimes, the ranking models are built without considering the effect of the position where an item was presented, with items placed higher in the feed tending to have more interaction from users, even though other lower-placed items may be more relevant. This problem is named position bias. The position bias is the difference in expected performance of an item based on a location where the item is placed within an ordered set of items. For example, the position bias may indicate the improved performance of the item when the item is moved from position 3 to position 2, or the degradation in expected performance when the item is moved from position 1 to position 3.

In general, recommender systems present a set of items in order. For example, the items may be ads on a feed, suggestions of PYMK to the user, job-posting recommendations, possible candidates to recruit for a job post, news items on a user feed, etc. Typically, algorithms such as ML models are used to rank the items in order of relevance by assigning a relevance score to each item and then sorting the items according to their relevance. By providing the highest-relevant items, the probability that the user will interact with presented items is higher than if the items were not presented according to their relevance.

The relevance may be based on past user behaviors, also referred to as user engagements, e.g., the interactions of users with items presented to the users. There is a training process that uses the training data based on the past interactions to build the ranking models. However, many times the ranking models do not take into consideration the position where an item was placed within the list of results. For example, users tend to pay more attention to the first ad shown on the feed that to the second ad. Also, users may not even see an ad if the user has to scroll down a page to see the ad.

By not taking into consideration the position bias, the ML models may not generate the best relevance scores. For example, a possible connection for a user may be given a high-relevance score because the possible connection has been shown previously often towards the top of the list of results.

In some prior solutions, recommender systems used randomization in the position of the items to deliberately inject noise into the recommendations. The idea is that if items are randomly shuffled regardless of relevance, then any kind of empirical relationship found between position and people interacting is position bias. However, this is a problematic approach to some businesses (especially ad delivery) that depend on showing relevant ads, and the injected noise will affect the revenue derived from ads because lower relevant ads will generate less revenue. Further yet, noise-injecting approaches will likely use small sample sizes to overcome these problems, but small sample sizes means less reliable training sets due to the low impact of the small sample set when training the models.

Another tried approach is Regression Discontinuity Design (RDD) that uses observational causal methods by comparing predicted relevance of two adjacent items. Such item pairs are correlated with low-item relevance or low-quality relevance models which do not effectively model the relevance difference between two similar items. For this reason, RDDs typically do not have external validity when generalized beyond low-relevance items or platforms with ineffective relevance models.

In some example embodiments, the experiment results 104 for testing models are used to estimate the position bias. At a high level, the idea is that the experiment results 104 are used to obtain information about a relationship between the position in which an item was shown and its expected engagement. The position bias problem is finding the relationship between the position where an item is shown and the level of user engagement the item receives.

This is a difficult problem because, on average, items that are shown on top of the page tend to be more relevant, so it is hard to determine that relationship between position and engagement regardless of actual relevance.

Embodiments leverage the past experiment results 104 for those cases when there is a change in the ranking model. Because of this change, some users are seeing version A of the model and some users are seeing version B of the model. The method leverages the fact that there is an item in version A ranked at a first position in the list of results and ranked in a different position in version B. Thus, there are different positions for the same item based on the testing of the models, and this difference may be utilized to determine the position bias. There is no need to perform new testing that places items in different positions because the past experiments already have done this. Thus, the determination of position bias does not require testing on the live system that is generating revenue for the service provider.

Figure 2:
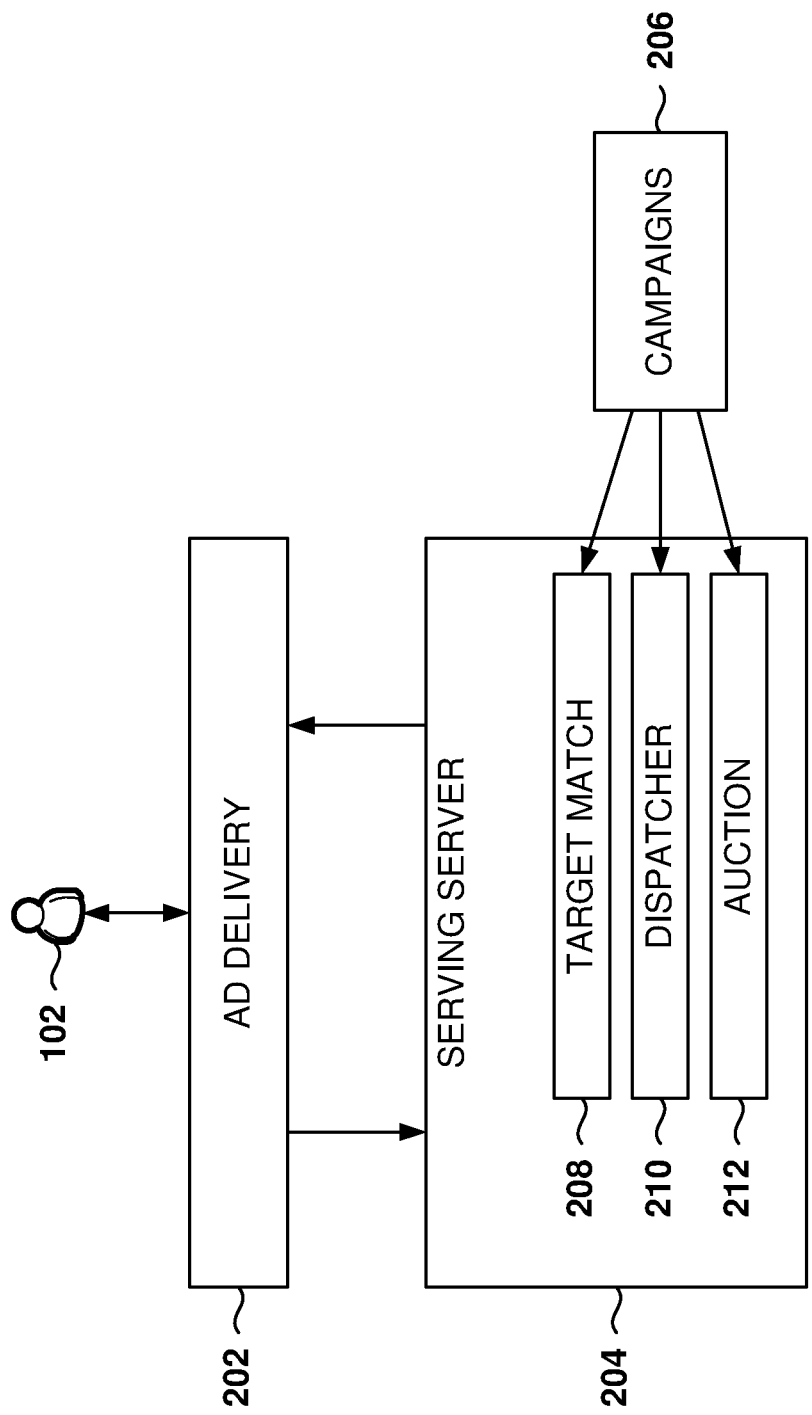
FIG. 2 is a high-level diagram of a system for placing advertisements in a user feed, according to some example embodiments.

FIG. 2 is a high-level diagram of a system for placing advertisements (i.e., ads) in a user feed, according to some example embodiments. Advertisers design campaigns 206 to place ads in the feed of users 102. A campaign 206 includes the ads from one of the advertisers. The serving server 204 manages the ad delivery 202 of the selected ads, and the serving server 204 includes a target match 208, a dispatcher 210, and an auction manager 212.

The target match 208 selects ads for delivery. The dispatcher 210 schedules the delivery of ads, and the auction manager 212 manages the bidding process where advertisers place bids to place their ads in the user feeds.

In some example embodiments, the position bias may affect the bidding process because the service provider wants to evaluate how likely advertisers are to want to place an ad for this type of user 102. Position bias may result in the removal of bidding candidates from the bidding process because poorly matched candidates are removed, although they may be good candidates.

The click-through Rate (CTR) prediction is a key component of an ad-serving system as it directly determines the ads ranking and pricing. Increasing the accuracy in CTR prediction is important to maintain a healthy ad-serving system that maximizes advertisers' return on investment. In some prior solutions, CTR models are trained with users' historical click/not-click behavior, which can be impacted by the true relevance of the ads and by the position of the ads. A known challenge is that models trained in this way suffer from the position bias since they do not reflect users' true preference on different ads and can give advantages to ads that were shown on top positions in the past. Therefore, an important task in CTR predictions is to disentangle the position effect from the true relevance in order to serve ads in a position-aware manner.

Tests to evaluate models for the bidding process have been performed for a long time, so there are plenty of experimental results for evaluating relevance models and product features. Leveraging historical A/B tests allows the analysis of exogenous variations without manually introducing variations affecting service delivery. The impact of ranking changes, as induced by these exogenous variations, is then estimated through instrumental variable analyses. Specifically, the presented methodology exploits the two-sided nature of modern online marketplaces, using experimentation on the ranking of items in a manner orthogonal to user-side relevance.

At a high level, the system analyzed experiments that changed this bidding procedure to place ads in different spots, where the A/B testing involved having different users randomly receive different bidding procedures, which caused placing the ads in different places in the user feeds. The results allow looking at past data where ads were placed in different positions and where placement variation is not due to the estimated relevance by one relevance model but rather due to the use of different relevance models that assigned different relevance scores.

In some example embodiments, several ad campaigns were considered because there may be statistical problems when comparing campaigns that are used concurrently, because if an ad is in one position for one campaign, then another ad from another campaign may not be in the same position as it is already occupied.

In some example embodiments, the instrumental variables (IV) method of Angrist et al. (Angrist, Imbens, and Rubin (1996), *Identification of causal effects using instrumental variables*, Journal of the American Statistical Association, 91(434):444-455, herein incorporated by reference) is used to leverage the experiment data from ranking-algorithm testing to estimate the position effect. The challenge in applying the IV method is to design a technique for finding an instrumental variable (in this case the Z defined below).

The IV method is used to estimate causal relationships when controlled experiments are not feasible or when a treatment is not successfully delivered to every unit in a randomized experiment. Intuitively, IV methods are used when an explanatory variable of interest is correlated with the error term, in which case ordinary least squares and ANOVA methods give biased results. A valid instrument induces changes in the explanatory variable but has no independent effect on the dependent variable, allowing a researcher to uncover the causal effect of the explanatory variable on the dependent variable. IV methods allow for consistent estimation when the explanatory variables are correlated with the error terms in a regression model.

Explanatory variables that suffer from one or more of these issues in the context of a regression are sometimes referred to as endogenous. In this situation, ordinary least squares produces biased and inconsistent estimates. However, if an instrument is available, consistent estimates may still be obtained. An instrument is a variable that does not itself belong in the explanatory equation but is correlated with the endogenous explanatory variables, conditionally on the value of other covariates.

Regarding notation for the analysis, there is an instrument Z, also referred to as instrumental variable, for a past experiment that affected item positions, a treatment W that is the feed position, and a response Y (e.g., engagement) that is an indicator of a selection by the user 102 (e.g., a mouse click). One goal is to estimate the effect of W on Y utilizing the instrument Z.

In our case, there is a group of users (e.g., viewing the user feed), who interact with, or respond to, a set of items (e.g., ads, candidates for PYMK, job posts, news articles), where the response event can be defined as a click, a conversion, or other feedback from the user. The goal is to study the effect of how an item's position affects the user's propensity to interact with the item, all else held equal.

Further, I denotes items, J denotes requests, and i and j are a specific item and request, respectively. For each request, multiple items are shown to the user based on the underlying serving system with various relevance models. For request j, $e_{ijk}=\mathbb{1}$ (response$_{ijk}$) is the counterfactual response indicator given that item i is shown in position k in request j. Binary responses are considered for the analysis. Further, $\mathbb{1}$ represents a binary response, which for ads means whether the user clicked on the ad or not.

Further, the item-level $\tau_i$ and system-level position effect $\tau$ between any positions $k_1 > k_2$ is defined as follows:

$$\tau_i(k_1,k_2) = \mathbb{E}_J[e_{ijk_1}|I=i] - \mathbb{E}_J[e_{ijk_2}|I=i],$$

$$\tau(k_1,k_2) = \mathbb{E}_I[\tau_i(k_1,k_2)]. \quad (1)$$

Thus, level $\tau_i$ and $\tau$ represent the position bias, to calculate the difference in engagement $\mathbb{E}$. For example, what is the difference in click-through rate for item i when moved from position $k_1$ to position $k_2$. These position effects could be interpreted as the expected change in users' response once an item is moved from position $k_2$ to $k_1$. One goal is to estimate these position effects, and two use cases are presented for ad delivery and PYMK, but the methodology proposed to identify and estimate these effects is general and can be applied to other use cases.

Further, it is also possible to focus on the request-level position effects defined as $\tau_i(k_2, k_1) = \mathbb{E}_I[e_{ijk_1}|J=j] - \mathbb{E}_I[e_{ijk_2}|J=j]$. Here, $\mathbb{E}$ is calculated as an average because the item (e.g., an ad) can be shown multiple times, and e is the response for a specific instance, such as a specific showing of the item. To estimate $\tau_i$ and $\tau$, observations at the request level are used. Specifically, each observation corresponds to a tuple (item, request, position). Table 1 below shows some example observations in this format.

TABLE 1

| Response | Item | Request | Position |
|---|---|---|---|
| 1 | 1 | 1 | 1 |
| 0 | 2 | 1 | 2 |
| 0 | 3 | 1 | 3 |
| 0 | 1 | 2 | 1 |
| 1 | 3 | 2 | 2 |
| 0 | 6 | 2 | 3 |
| ... | ... | ... | ... |

The challenge in estimating the position effects with such observational data is that the responses are confounded by factors such as the relevance. This confounding is addressed using the IV method approach.

Initially, the focus is on a specific item i, where the item-level position effect is $\tau_i(k_1,k_2)$. It is assumed that there was a past request-side experiment that affected the items' position, and only affected users' response through its impact on the positions. The requests in which item i was shown either in position $k_1$ or $k_2$ during the experiment are considered. Further, $W_j$ is the position of the item, $Z_j$ is the treatment request j received in the selected experiment, and $Y_j$ is the corresponding binary response (e.g., click on the ad, request a connection). The following IV model is considered:

$$W_j = \alpha_0 + \pi_1 Z_j + X_j^T \alpha + \epsilon_{1j},$$

$$Y_j = \beta_0 + \pi_2 W_j + X_j^T \beta + \epsilon_{2j}, \quad (2)$$

In equation (2), $X_j$ is the request-level covariates, and $\pi_2$ is the position effect of interest. Equation (2) imposes a linear restriction on the position effect, that is, equation (2) computes an average position effect, e.g., an increase in three positions has the same effect as three times the increase in a single position. Further, this assumption rules out position effects that vary based on what the starting position $k_2$ is. To relate this assumption with the notation in equation (1), $\tau_i(k_1, k_2) = c_i \times (k_2 - k_1)$ is imposed for some constant $c_i$. When the position effects have such a linear relationship, the indirect least squares (ILS) or two-stage least squares (2SLS) estimator of equation (2) with $W_j$ treated as a continuous variable provides an unbiased estimate of $c_i$: $\mathbb{E}[\hat{\pi}_2] = c_i$, where $\mathbb{E}$ is the engagement. The values with the ^ in the name are the values that are being estimated, and the position bias $\hat{\pi}_2$ is the value being estimated.

The selected instruments $Z_j$ are relevant because they are part of a routine model that operates for the reranking items. Further, it is assumed the exclusion restriction where the instruments only affect outcomes $Y_j$ via their effect on positions $W_j$. This assumption is plausible by picking instruments carefully, leveraging the two-sided nature of the marketplaces under study. In the ads marketplace, there are users and advertisers, and in PYMK, there are two kinds of users: viewers (those who send connection invites) and candidates (those who receive connection invites). The institutional knowledge is leveraged in the construction on the rankings, which are determined by an ensemble AI model that includes a model that predicts user-side relevance (whether the user will click on the ad or send a connection invite) and advertiser-side relevance (how much do sponsored advertisers bid for a particular user in ads or what the predicted connection acceptance probability is in PYMK).

To estimate an item position effect, e.g., the effect of changing only the position at which an item appears on the interaction probability of users, the confounding from user-side relevance of items is examined, done by picking instruments that tune the model concerning the opposite side. Such model tuning occurs to improve relevance for sponsored advertisers in ads and the connection-acceptance probability in PYMK. At the same time, this tuning does not directly affect user-side relevance. Thus, these instruments induce exogenous variation in positions such that they do not affect outcomes $Y_j$ except through their effect on rankings, thereby satisfying the exclusion restriction.

To estimate $\tau(k_1, k_2)$, an estimator based on the estimated item-level position effects is considered. For example, let i=1, 2, ..., N be a random sample of items, and $\tau(k_1, k_2)$ is estimated with the following equation:

$$\hat{\tau}(k_1, k_2) = \frac{1}{N} \sum_{i=1}^{N} \hat{\tau}_i(k_1, k_2), \quad (3)$$

Here, $\hat{\tau}_i(k_1, k_2)$ is the Indirect Least Squares (ILS) estimator or the Two-Stage Least-Squares (2SLS) estimator based on equation (2). Although this estimator is unbiased for $\tau(k_1, k_2)$, its variance can be difficult to compute due to dependencies among the item-level estimators in certain applications. It is noted that in Table 1, responses in request 1 appear in the estimate of $\tau_1(1, 2)$ and $\tau_2(1, 2)$. Since responses in the same request are likely to be related, the naive variance estimator of $\hat{\tau}$ can be biased. In an extreme case where there can be at most one positive response in each request (as in the ads application), this relation cannot be ignored. To deal with this structured dependency, one row (item) is randomly sampled in each request and responses in the sampled rows are used to estimate $\tau$. This sampling step ensures the independence of observations in the inference for $\tau(k_1, k_2)$.

For the application of estimating position bias for ads CTR, one goal is to learn the potential change in CTR when an ad's position is changed in the feed. Without running an experiment, this is a challenging problem. Running the experiment, however, can potentially cause a meaningful loss in revenue. After all, ads displayed at different positions were ranked there for a good reason: higher-placed ads are predicted to have higher relevance for the given search. However, different rates are observed at different positions, which is reasonable to expect that both position and underlying ad relevance determine ad clicks.

Experiments that affect ad position often do so by changing the models that predict ad relevance. Such experiments, however, rule out using predicted relevance as a feature in the model. This is a problem, because it is known that an ad's true relevance should be correlated with both position and click probability; hence, the best estimates of relevance should be included as a feature in the model. Naturally, if those estimates are different under treatment and control, they cannot be included as features.

This motivates the instrument selection, a prior experiment that affected ad positions not by changing the predicted CTR (and hence the estimated ad relevance), but by experimenting with the ad-bidding procedure itself on the user level. The method leverages an experiment that compared the existing bidding procedure to a new reinforcement learning-based, automatic bidding method, to help advertisers determine bid values. It is noted that this experiment has no impact on predicted relevance, and this experiment naturally has a strong impact on ad position, but still allows the use of consistent ad relevance estimates as features in the IV model.

An IV model works on the relevance of the instrument, that is, on the nonzero effect of the instrument on the treatment, in this case the feed position. Considering the full set of ad campaigns 206 together, this regression is not meaningful. For a given user and query, several ads will appear. Moreover, if an ad is in position 1, then another ad cannot be in position 1 because it is already occupied. This introduces a problematic correlation. Consider the case with only two ads, A and B, the position of A determines the position of B and the regression coefficients are not identifiable. It would be possible to find regression coefficients, but they would not be trustworthy due to this collinearity. Further, if a stage 1 regression is attempted, the coefficient would be essentially meaningless when considering the full set of ads in one regression.

In some example embodiments, the level of estimation for this regression is assigned to be each ad campaign 206. By reducing the data to those requests featuring a specific ad campaign, one observation per request is sampled since the same ad campaign does not typically appear multiple times in a single request. Thus, by only sampling at most a single observation per request, the problematic correlation across observations in the same request is removed. For the illustrated example presented herein, 100 large ad campaigns were considered, which amounts to about 44 million ad views across the top 30 feed positions on one day.

At a high level, equation (1) defines formally the quantity being calculated. Equation (2) describes the method used to calculate that quantity, and equation (3) defines how to summarize the quantity. Thus, $\hat{\tau}_i$ is the position bias for each ad campaign. Based on each ad campaign, there may be a different position bias. For example, some ads may be highly relevant to some people regardless of position so they may have a low position bias. Other ads may not be interesting to users, so they may have a stronger position bias. Equation (3) captures that once the position biases is calculated across many different ad campaigns, the position bias is averaged to obtain a number that summarizes the global position bias observed by users across the campaigns.

By leveraging prior experimentation, the method obtains quasi-experimental variation in item rankings that is orthogonal to user relevance and provides robust position effect estimates that handle unobserved confounding well, greater generalizability, and easily extends to other information retrieval systems.

Figure 3:
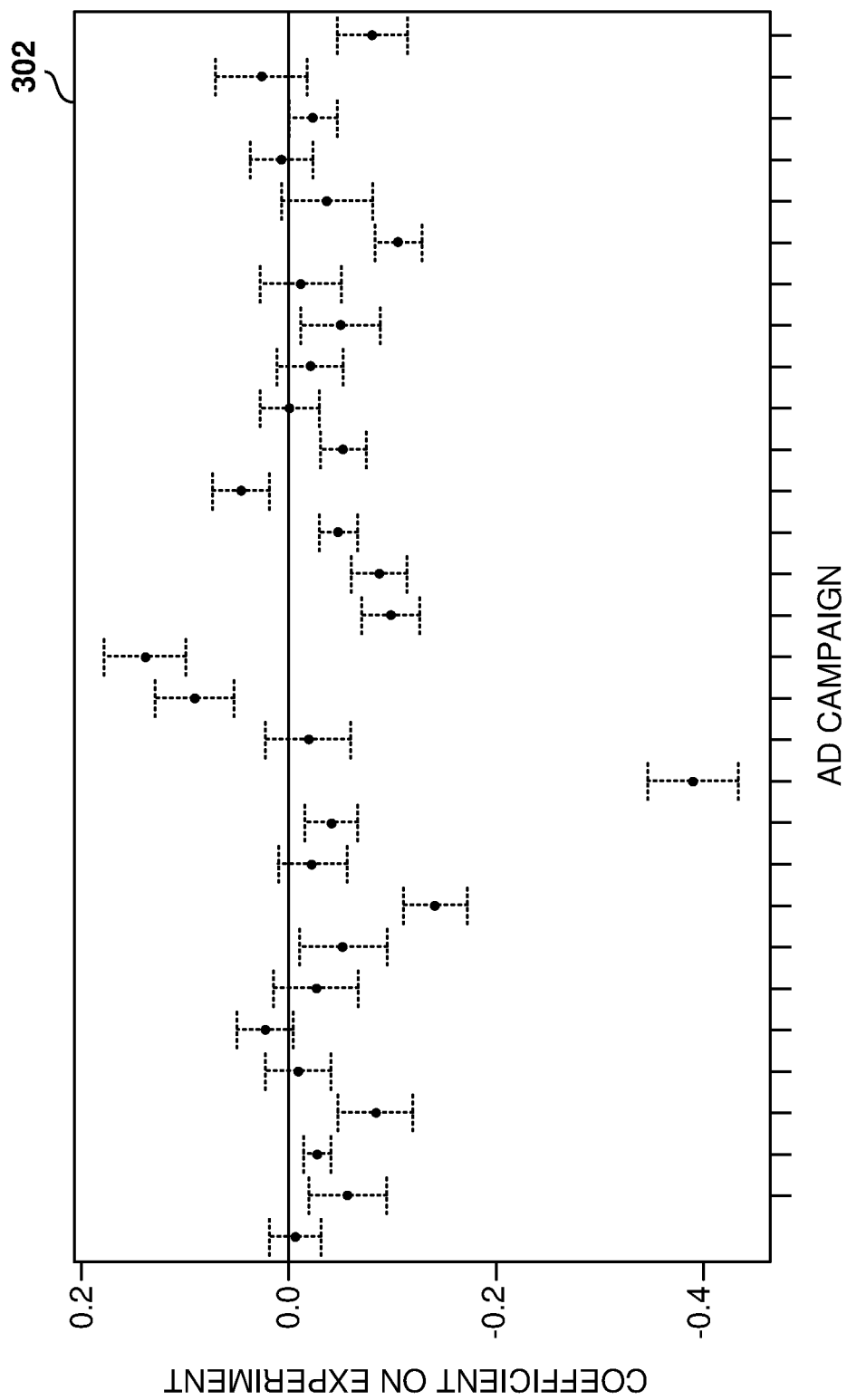
FIG. 3 is a chart showing the impact of bidding on past experiments for some ad campaigns.

FIG. 3 is a chart 302 showing the impact of bidding on past experiments for some ad campaigns. In the illustrated example, three model specifications were considered to estimate the position effects, as illustrated in Table 2.

TABLE 2

| | Spec 1 (IV) | Spec 2 (IV, preferred) | Spec 3 (OLS) |
|---|---|---|---|
| Outcome | 1(click) | 1(click) | 1(click) |
| Endogenous variables | Feed position | Feed position | N/A |
| Instruments | Experiment = treatment | Experiment = treatment | N/A |
| Control variables | N/A | PCTR | Feed position, PCTR |

Specification 1 is the simplest IV specification, which seeks the effect of feed position on 1 (click) using the treatment as the instrument. Specification 2 is like Specification 1 with the addition of a control variable predicted CTR (PCTR), which is the measure of relevance for the ads-use case. Specification 2 attempts to capture ad relevance. It is noted that that the ad relevance model remains stable throughout the duration of the experimentation. Specification 3 is an Ordinary Least Squares (OLS) non-causal baseline, which does not include the instrument (experiment=treatment). The preferred model is Specification 2, which allows leveraging leverage the past randomness and estimate a causal effect while also controlling for any residual effects of predicted ad relevance in the model.

Chart 302 shows the coefficient-on-experiment (COE) (vertical axis) showing the impact of the bidding experiment, which was randomized on the user level, on feed position for individual ad campaigns. The COE value reflects the effect of that experiment on the average positions in the news feed.

It is observed that these coefficients correspond to the first stage of the instrumental variables model. Chart 302 shows thirty ad campaigns (horizontal axis) with the most feed views in the time window. It is observed that there were different kinds of effects where some ads were bumped down on average, and some ads were bumped up on average, and then some ads on average did not move.

The most robust IV results will correspond to a strong stage-1 regression, meaning a low p-value and a relatively large coefficient; otherwise, it is unlikely that a causal effect will be detected. Moreover, it is reasonable to assume that the bidding experiment will affect different ad campaigns differently, and indeed the experiment shows a range of stage-1 regression information.

Chart 302 shows the COE for thirty ads with the most feed views, along with 95% confidence intervals. A negative coefficient indicates that the bidding experiment used as the instrument on average moved ads up in the feed (decreased their feed position). For example, for the second ad on the chart, the COE is below 0, which means that when the second ad was assigned to new bidding procedures, the second ad ended up, on average, at a lower-ranked spot.

The experiments show the ability to manage interference by looking at each campaign separately; a user does not usually see more than one ad from a given campaign in her feed at any given time. This comes along with its own limitations on interpretation; namely, for ad campaigns that did not see major ranking changes due to the bidding experiment, a robust position effect estimate was not given. The results should be constrained as estimates for those that were significantly affected by the choice of instrument.

None of the ads that were moved to lower-ranked spots because they were thought to be less relevant; they were moved because they were either randomly assigned to this new bidding procedure or because they were kept in the old bidding procedure. This means that the same ad, with the same kind of relevant scores, was randomly moved up and down in the feed, which was the effect of the feed position, because everything else was held constant.

Figure 4:
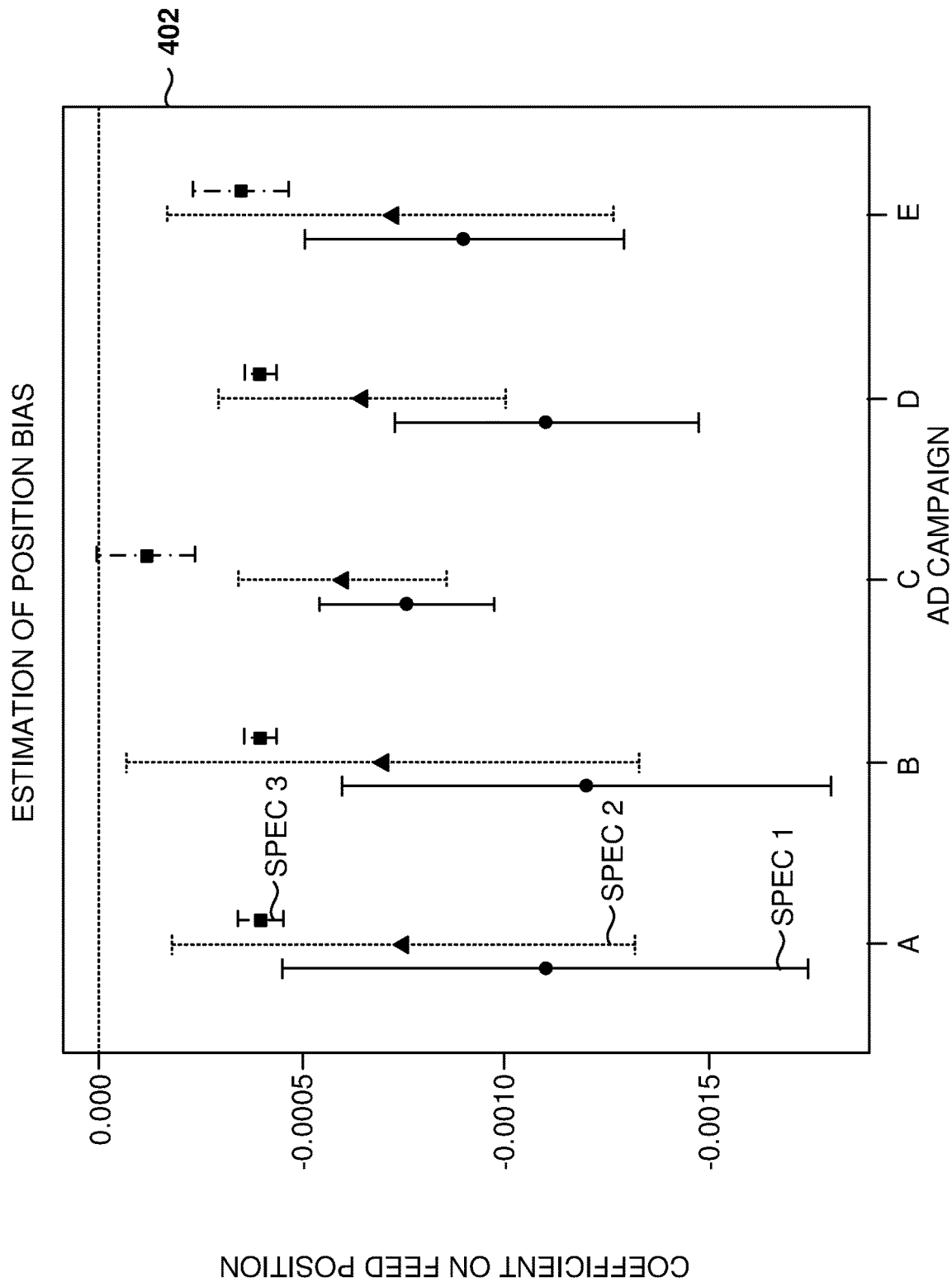
FIG. 4 is a chart illustration the estimation of position bias, according to some example embodiments.

FIG. 4 is a chart 402 illustration the estimation of position bias, according to some example embodiments. Ads were selected with the most statistically significant stage-1 coefficients among the 50 ads with the most feed appearances. This provides an estimate of position bias for campaigns with the most robust available IV estimation.

The vertical axis is for the Coefficient on Feed Position (COFC) and the horizontal axis is for each of five campaigns A-E, where three ranges are presented for each campaign corresponding to the three specifications from Table 2.

The COFC is the position effect, where the more negative the COFC is, the stronger the effect of being in a lower feed position. The results show a position effect across several model specifications, including a model accounting for predicted click-through rates (the preferred model specification). These results are for ad campaigns in which the instrument, namely the bidding experiment, had a strong impact on the feed position in which the ad appeared. Hence, interpretation should be constrained as follows: in ad campaigns that were strongly affected by the bidding experiment, there is a robust and statistically significant effect of ad position on click-through rate. These ad campaigns might differ systematically from the campaigns without smaller impact from the bidding experiment, and that difference could apply to position effects as well.

The COFC below 0 shows that when the position is moved up the feed, the result is more clicks, which is an intuitive, expected result. The COFC shows the different values for the position bias effect for the campaigns and the value intervals are the different confidence intervals.

Table 3 shows the regression information for ad campaign A. Across the model specifications, moving an ad to a higher feed position decreases click probability; higher PCTR is consistently correlated with greater click probability. In model (2), the coefficient estimating the impact of feed position drops in magnitude. This is likely because the PCTR is included in this model, and the feed position coefficient in model (1) accounts for lower feed position being correlated with a higher PCTR.

TABLE 3

| | Dependent variable: Ad click (1 or 0) | | |
|---|---|---|---|
| | IV (1) | IV (2) | OLS (3) |
| Feed position | −0.0012*** (0.0003) | −0.0007** (0.0003) | −0.0004*** ($2.07 \times 10^{-5}$) |
| PCTR | | 0.70*** (0.032) | 0.72*** (0.024) |
| Constant | 0.016*** (0.003) | 0.0058** (0.002) | 0.0035*** (0.0003) |
| Observations | 402,358 | 402,358 | 402,358 |
| Residual Std. Error | 0.089 (df = 402358) | 0.089 (df = 402357) | 0.089 (df = 402357) |

*$p < 0.1$;
**$p < 0.05$;
***$p < 0.01$

The coefficients on feed position are consistently negative, which lines up with intuition that moving an ad up higher in the feed (that is, decreasing feed position) will raise click probability. For the preferred specification, the coefficient for ad campaign A on feed position is −0.0007 (with a standard deviation of 0.0003). That is, if ad A is moved from position k to position k−1, the probability of a click will increase on average by +0.07%. Compared to the constant estimate of 0.58%, this amounts to an increase of 12%. For example, placing an ad on the top spot will get 12% more clicks than placing the add in the second spot in the feed.

Figure 5:
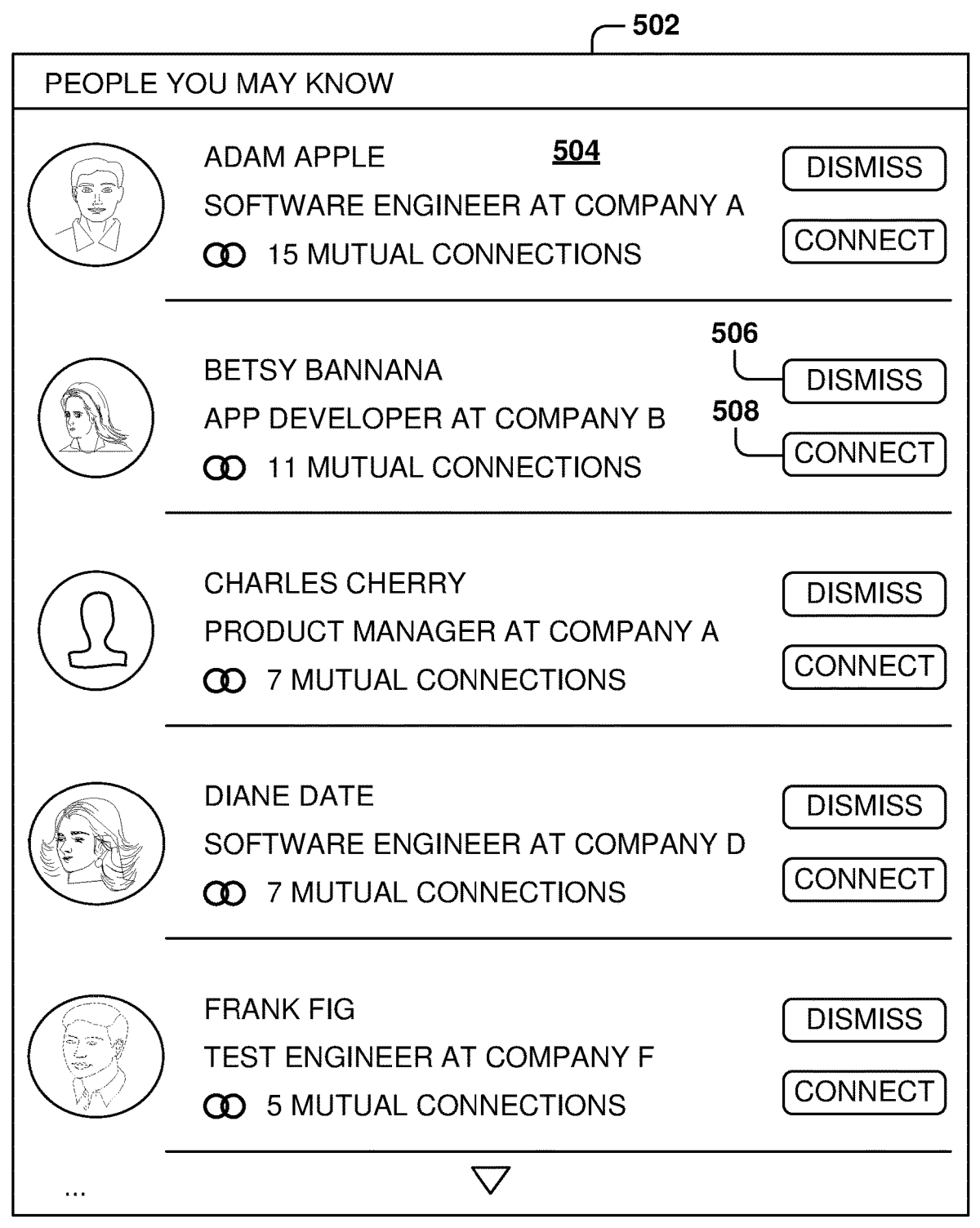

FIG. 5 is a people-you-may know (PYMK) user interface 502 for recommending new social connections to a user of an online service (e.g., a social networking service), according to some example embodiments. The PYMK user interface 502 includes PYMK suggestions for a particular user of the social networking service. It is noted that the PYMK search for possible new connections may be initiated by the user by selecting an option in the online service, or the PYMK search may be initiated by the system and presented in some part of the online service user interface as an option with some initial suggestions.

The PYMK user interface 502 presents a plurality of user suggestions 504 and scrolling options for seeing additional suggestions. In some example embodiments, each user suggestion 504 includes the profile image of the user, the user's name, the user's title, the number of mutual connections, an option to dismiss 506 the user suggestion, and an option to request connecting 508 to the user suggestion. Mutual connections between two users of the online service are people in the online service that are directly connected to both users.

When the user selects the dismiss option 506, the dismissal is recorded by the online service so that user is not suggested again. When the user selects the connect option 508, the online service sends an invitation to the selected user for becoming a connection. Once the selected user accepts the invitation, then both users become connections in the online service.

It is noted that the embodiments illustrated in FIG. 5 are examples and do not describe every possible embodiment. Other embodiments may show a different number of suggestions, include additional data for each suggestion or less data, present the suggestions in a different layout within the user interface, and so forth. The embodiments illustrated in FIG. 5 should therefore not be interpreted to be exclusive or limiting, but rather illustrative.

In some example embodiments, a connection-recommendations algorithm provides users suggestions of candidate connections ranked according to the predicted relevance. The connection-recommendations algorithm comprises an ensemble ML model that predicts the propensity of two users making a connection and engaging. This model is trained using past data of shown recommendations and the success rate for establishing connections. When the training does not account for position bias, the model may be erroneous, which impacts the healthy growth of the social network. Thus, like in the ad-serving application, debiasing the PYMK recommendations algorithm from position bias is important in the estimation of true relevance, as defined as the true propensity for a PYMK user to send a connection request to a recommended candidate. A first step to debiasing is the accurate estimation of the position bias, which may then be used as an input in the engineering flow for recommendation generation.

To identify the position effect of invites sent in PYMK, the question raised is, what is the additional likelihood that the user will send an invitation to a candidate connection because of the candidate position in the PYMK rankings? In other words, in a given session, if the same candidate was ranked in position 2 as opposed to position 3, would the candidate see a higher probability of receiving a connection invite?

In some example embodiments, the problem is framed as a causal inference problem to isolate the effect of changing only position. A correlational analysis of candidate positions and the subsequent probability of accepting invites received is confounded by the fact that higher-ranked candidates, on average, are more relevant to the viewers (in the sense of actually leading to a successful connection formed). Thus, it is understood that a causal position effect would identify the behavioral response on the part of viewers to send connection requests on PYMK, holding fixed candidate quality or relevance.

In some example embodiments, the PYMK offline ranker is an ensemble model consisting of four constituent AI models:
1) pInvite: a model predicting the probability pInviteScore that the user sends the candidate an invite,
2) pAccept: a model predicting a probability pAcceptScore that the candidate accepts an invite from the user,
3) destSessionUtility: a model predicting the interaction between the user and the candidate once connected, and
4) destRetentionUtility: a model measuring broader engagement of the candidate on the online service after connecting with the user.

The candidates are ranked based on a multi-objective optimization function (MOO), which is a function of the predicted values of these four models. In particular, the pInvite model is trained using historical PYMK data, e.g., candidates who have been impressed in viewers' PYMK and their corresponding outcomes (whether the user sent an invite) become labels for training. Ignoring position effect during model training can potentially yield biased estimates if two candidates' labels are treated equally by the model but one candidate was positioned lower than the other.

In some example embodiments, the method for causal identification includes using A/B testing results from the constituent four models of the PYMK MOO score. Specifically, the experimentation in the pAccept model and the weights of each of the individual AI models in the overall MOO score are considered. Whether someone accepts an invitation is not related to whether the candidate was relevant for sending an invitation. The goal of the PYMK modeling is to improve the model to match recipient candidates and how likely are the candidates to accept the invitations.

Since the experiments are randomized on viewers, any systematic difference seen in the positions candidates take between the PYMK grids of viewers in the treatment group and those in the control group is random and therefore unrelated to viewer characteristics. Thus, it is possible to use the PYMK AI experiments as instruments to exogenously move the position of candidates, which we may then use to identify the position effect on the probability of sending PYMK connection invites.

In some example embodiments, the dataset includes values for tuples consisting of (user, candidate, query). In one example test, the dataset includes 38 M observations, 3.8 M unique users, 24 M unique candidates, and 22 PYMK related reasons. There are two treatment variants, randomized at the viewer level, the pInviteScore, and the pInviteOutcome, which is the final outcome of whether the user sent a connection invite to the candidate or not. Further, it is noted the rank where each candidate was displayed to the user in the latter's PYMK query, as well as the session depth, which is the number of recommendations the user was served in a particular session.

In some example embodiments, the independent variable model is the pInviteOutcome. The IVframework for the causal results are used. Further, to identify multiple endogenous variables, multiple instruments are used. Given the single binary treatment, the instruments are combined with relatedReason, resulting in about two dozen instruments. Further, relatedReason refers to one or more of the reasons or parameters behind the PYMK recommendation, such as "People you may know from your university," "People you may know from your employer," or "People you may know in San Francisco Bay Area." Given this setup, the following edge-level regression specifications were run as described in Table 4:

TABLE 4

| | Spec 4 (IV) | Spec 5 (IV) | Spec 6 (IV) | Spec 7 (OLS) |
|---|---|---|---|---|
| Outcome | pInviteOutcome | pInviteOutcome | pInviteOutcome | pInviteOutcome |
| Endogenous variables | onlineMooRank | onlineMooRank | onlineMooRank, sessDepth | N/A |
| Instruments | treatment × relatedReason | treatment × relatedReason | treatment × relatedReason | N/A |
| Control variables | No | pInviteScore | pInviteScore | onlineMooRank, sessDepth, pInviteScore |

Specification 4 is the simplest IV specification that seeks the effect of onlineMooRank (the final position that a connection recommendation is placed in in the PYMK grid) on pInviteOutcome. Specification 5 is like Specification 4 with the addition of the control variable pInviteScore. Since the treatment variants did not explicitly seek to randomize PYMK positions between treatment and control, there may be systematic match quality differences between the two variants. For this reason, pInviteScore acts as a way to control for match quality.

Specifications 4, 5, and 6 use the IV model, which is a causal method. The Specification 7 is for the OLS method, which is not a causal method, that examines raw correlations between position and engagement, whereas the IV method does not consider the raw correlation, but actually using the experiment to get at variation in the ad position that is considered to be as good as a random selection. There are different precisions to run the IV analysis, and different variables are used to control for different effects.

The preferred specification is Specification 6, which is Specification 5 with an additional endogenous variable, sessDepth. Further, sessDepth is the session depth, which is how far a user scrolls down the list of recommendations suggestions to see the recommendation, and sessDepth is a way to control for how some users scroll a lot while other users do not scroll much. Again, the treatment did not just randomize PYMK position. If session depths vary systematically between treatment and control, that may indicate a difference in match quality, and this difference should not be driving the Specification IV results. As sessDepth responds to treatment, it is included as an endogenous variable in this specification. Further, as a baseline, the ordinary least squares (OLS) estimates are included, which do not involve any instruments.

Sample results are presented in Table 5 below with estimates from various regression specifications in the edge-level PYMK analysis. The standard errors are clustered at the viewer level, at which level the treatment is randomized.

TABLE 5

| | Dependent variable: pInviteOutcome | | | |
| --- | --- | --- | --- | --- |
| | IV (4) | IV (5) | IV (5) | OLS (7) |
| onlineMooRank | −0.038*** | −0.038*** | −0.063*** | −0.005*** |
| | (0.001) | (0.0005) | (0.001) | (0.0001) |
| sessDepth | | | 0.013*** | 0.022*** |
| | | | (0.001) | (0.0001) |
| Constant | 0.192*** | 0.199*** | 0.210*** | −0.196*** |
| | (0.003) | (0.003) | (0.003) | (0.001) |
| Controls | No | pInviteScore | pInviteScore | pInviteScore |
| Observations | 3,855,397 | 3,855,397 | 3,855,397 | 3,855,397 |
| $R^2$ | −0.520 | −0.513 | −0.822 | 0.158 |
| Adjusted $R^2$ | −0.520 | −0.513 | −0.822 | 0.158 |
| Residual Std. Error | 0.231 (df = 3855395) | 0.230 (df = 3855394) | 0.253 (df = 3855393) | 0.172 (df = 3855393) |

Note:
*$p < 0.1$;
**$p < 0.05$;
***$p < 0.01$

The coefficient on onlineMooRank is the position bias effect of interest. Consistent non-zero position effects across the regressions were observed, with the Specification IV point estimates spanning the range between −0.063 and −0.038. This means that when a candidate is bumped up one rank on the PYMK page, then the candidate is likely, on average, to see between 3.8% and 6.3% higher probability of receiving a connection invite.

The empirical results in PYMK show a robust position effect across multiple specifications. This is evidence for a non-zero and economically-significant position effect among users when sending out connection invitations. This position bias effect is calculated after accounting for match quality and is thus a behavioral artifact on the part of users. Analogously, there is a consistent position effect for ads in the feed, observed across a range of ad campaigns highly impacted by the bidding experiment (that is, with a strong instrument).

Further, some considerations regarding how to interpret the result in the context of the PYMK UI. First, the multiple instruments used were by interacting the treatment, which was randomized across users, with the relatedReason, which was not. Thus, the estimates represent a homogeneous position effect across all the relatedReason sections on the PYMK, each of which is presumed to have similar effects as the others.

Figure 6:
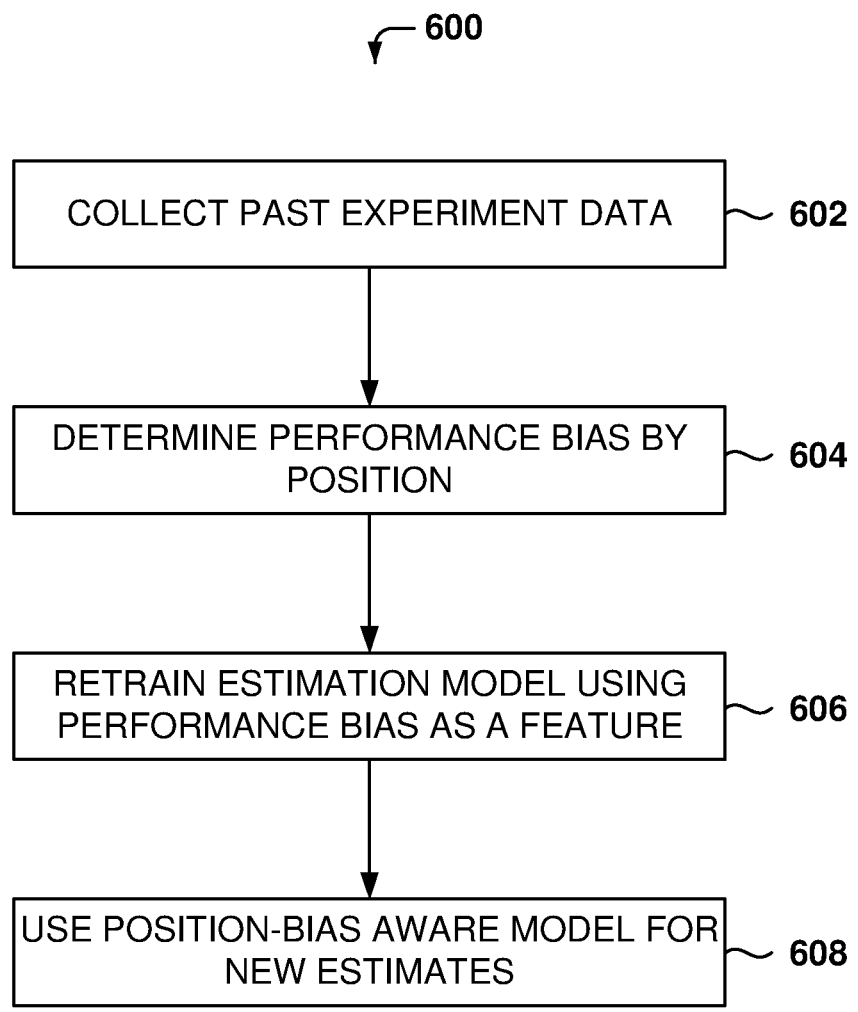
FIG. 6 is a flowchart of a method for obtaining models that account for position bias in the training data, according to some example embodiments.

FIG. 6 is a flowchart of a method 600 for obtaining models that account for position bias in the training data, according to some example embodiments. While the various operations in this flowchart are presented and described sequentially, one of ordinary skill will appreciate that some or all of the operations may be executed in a different order, be combined or omitted, or be executed in parallel.

At operation 602, the experiment data from previous experiments is collected. For example, the experiment data includes results for A/B testing of new models for ad-serving relevance or PYMK relevance.

From operation 602, the method 600 flows to operation 604 where the performance bias by position is determined. For example, the performance of an item may be measured by the probability that a user interacts with the item, or that an invitation is accepted for suggested new connection, etc., and the performance bias indicates the change in performance for the item based on the placement of the item within the list of items presented.

The position bias may be calculated as discussed above for the examples of ad-serving and PYMK, although the same principles may be used for other feeds. For example, the presented embodiments can also be implemented for other multi-slot ad-serving systems with a well-established experimentation platform. Some examples include user feeds for online services (e.g., Facebook, Twitter, Instagram, Tiktok, Xiaohongshu), ads embedded with search results, inclusion of sponsored products on an e-commerce website, etc.

From operation 604, the method 600 flows to operation 606 to retrain an estimation model using performance bias as a feature to create a model that is not biased by the position of items when placed in the list of items. For example, using the position bias estimate, a discount factor is added during model re-training that adjusts for the position in training data using either a linear or an exponential term of the position, depending on how the bias estimate was obtained. The new post-processed model provides debiased recommendations.

The existence of position effects is important to note in model training, where impressed items are matched with their realized outcomes (labels) to form the training data. The estimated position effects stipulate that lower-ranked items would have realized a better outcome had they been positioned higher, even conditional on impression. Therefore, to train a model without adjusting for position effects means that we are understating the labels of lower-ranked items relative to those higher-ranked items in model training, which could lead to model bias if lower-ranked items are systematically different than higher ranked items in the features that are included in the model. Thus, the position-bias estimates are used in ranking model retraining for debiasing, such as by appropriately discounting user action for the item they interacted with by the modeled position bias in future training data. Such a correction plays an important role in the user action calibration layer of recommender systems. By taking the calculated position bias estimates, it is possible to reweigh the parameters of the ML model during training to account for position bias.

Thus, if an item has been placed in a low position in the feed and the item has been selected, then the item gets a boost when considering future relevance, so the next time around the item will be ranked higher than if bias was not accounted for.

The benefit of this methodology is using past experiment data instead of randomizing positions in a live system to estimate bias. The human factor has been removed from the model-improvement loop and the proposed solution may be used for many large data sets across many types of applications.

From operation 606, the method 600 flows to operation 608 where the position-bias aware model is used for new estimates, such as calculating relevance of ads or ranking PYMK suggestions.

One example of position bias correction in PYMK occurs as a simple discounter applied in the model training stage. The proposed debiaser occurs in two stages:

Stage 1: create a regularly scheduled pipeline that estimates position bias in PYMK periodically. As discussed above, there are two components of the ensemble AI model of PYMK: pInvite and pAccept. In some example embodiments, the position is re-computed whenever the pAccept model is tested in an A/B test. Further, the position bias estimate may be updated whenever the new estimate is determined statistically different than the current one.

Stage 2: After calculating the position bias, perform a discount of the pInvite model training outcome of whether the user sent a connection an invitation or not. The other components of the training remain the same. The discounted outcome variable in training changes the model recommendations, which have now been debiased for position effects.

Figure 7:
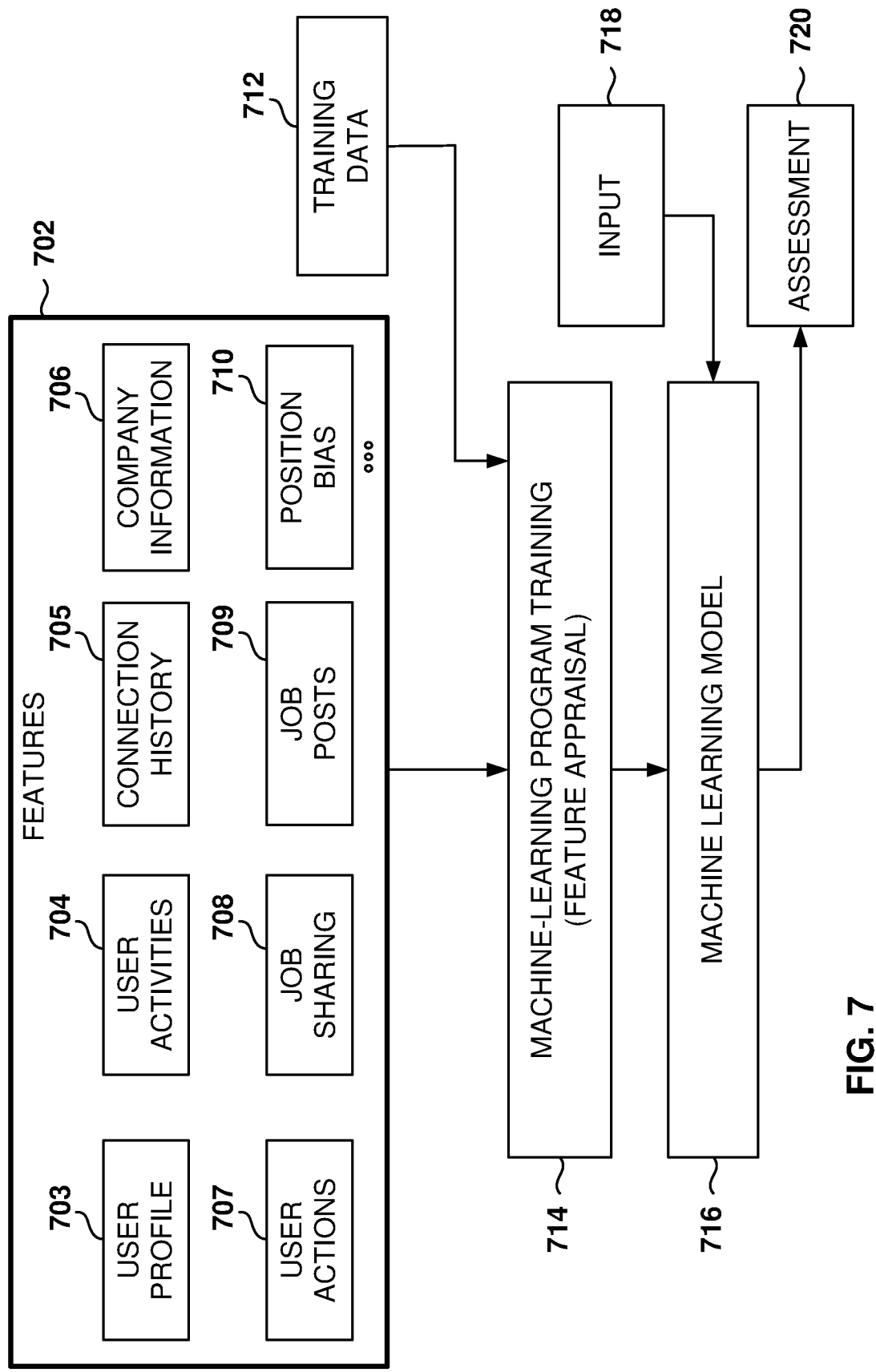
FIG. 7 illustrates the training and use of a machine-learning model, according to some example embodiments.

FIG. 7 illustrates the training and use of a machine-learning model, according to some example embodiments. In some example embodiments, machine-learning (ML) models 716, are utilized to calculate the models for calculating ad relevance, for calculating PYMK (e.g., pInvite, pAccept, destSessionUtility, and destRetentionUtility), calculating job-post relevance, feed-item relevance, news relevance, etc.

Machine Learning (ML) is an application that provides computer systems the ability to perform tasks, without explicitly being programmed, by making inferences based on patterns found in the analysis of data. Machine learning explores the study and construction of algorithms, also referred to herein as tools, that may learn from existing data and make predictions about new data. Such machine-learning algorithms operate by building an ML model 716 from example training data 712 in order to make data-driven predictions or decisions expressed as outputs or assessments 720. Although example embodiments are presented with respect to a few machine-learning tools, the principles presented herein may be applied to other machine-learning tools.

There are two common modes for ML: supervised ML and unsupervised ML. Supervised ML uses prior knowledge (e.g., examples that correlate inputs to outputs or outcomes) to learn the relationships between the inputs and the outputs. The goal of supervised ML is to learn a function that, given some training data, best approximates the relationship between the training inputs and outputs so that the ML model can implement the same relationships when given inputs to generate the corresponding outputs. Unsupervised ML is the training of an ML algorithm using information that is neither classified nor labeled, allowing the algorithm to act on that information without guidance. Unsupervised ML is useful in exploratory analysis because it can automatically identify structure in data.

Common tasks for supervised ML are classification problems and regression problems. Classification problems, also referred to as categorization problems, aim at classifying items into one of several category values (for example, is this object an apple or an orange?). Regression algorithms aim at quantifying some items (for example, by providing a score to the value of some input). Some examples of commonly used supervised-ML algorithms are Logistic Regression (LR), Naive-Bayes, Random Forest (RF), neural networks (NN), deep neural networks (DNN), matrix factorization, and Support Vector Machines (SVM).

Some common tasks for unsupervised ML include clustering, representation learning, and density estimation. Some examples of commonly used unsupervised-ML algorithms are K-means clustering, principal component analysis, and autoencoders.

The training data 712 comprises examples of values for the features 702. In some example embodiments, the training data comprises labeled data with examples of values for the features 702 and labels indicating the outcome, such an ad was placed at a certain position in the user's feed, a user accepted an invitation to connect, a user applied for a job post, etc. The machine-learning algorithms utilize the training data 712 to find correlations among identified features 702 that affect the outcome. A feature 702 is an individual measurable property of a phenomenon being observed. The concept of a feature is related to that of an explanatory variable used in statistical techniques such as linear regression. Choosing informative, discriminating, and independent features is important for effective operation of ML in pattern recognition, classification, and regression. Features may be of different types, such as, numeric, strings, categorical, and graph. A categorical feature is a feature that may be assigned a value from a plurality of predetermined possible values (e.g., this animal is a dog, a cat, or a bird).

In one example embodiment, the features 702 may be of different types and may include one or more of user profile information 703, user activity information 704 (e.g., articles read, jobs applied to, connections made, articles posted, jobs posted), connection history 705, company information 706, user actions 707, jobs shared or posted 708, job posts 709, position bias information 710, etc.

During training 714, the ML program, also referred to as ML algorithm or ML tool, analyzes the training data 712 based on identified features 702 and configuration parameters defined for the training. The result of the training 714 is the ML model 716 that is capable of taking inputs 718 to produce assessments 720.

Training an ML algorithm involves analyzing large amounts of data (e.g., from several gigabytes to a terabyte or more) in order to find data correlations. The ML algorithms utilize the training data 712 to find correlations among the identified features 702 that affect the outcome or assessment

720. In some example embodiments, the training data 712 includes labeled data, which is known data for one or more identified features 702 and one or more outcomes.

The ML algorithms usually explore many possible functions and parameters before finding what the ML algorithms identify to be the best correlations within the data; therefore, training may make use of large amounts of computing resources and time.

When the ML model 716 is used to perform an assessment, the input 718 is provided to the ML model 716, and the ML model 716 generates the assessment 720 as output. For example, the ad relevance is calculated as the assessment 720 when the user ID and the ad ID are used as inputs. In another example, the relevance of a candidate suggestion is calculated as the assessment 720 when the user IDs of the viewing user and the candidate user in the connection are provided.

In some example embodiments, results obtained by the model 716 during operation (e.g., assessments 720 produced by the model in response to inputs) are used to improve the training data 712, which is then used to generate a newer version of the model. Thus, a feedback loop is formed to use the results obtained by the model to improve the model.

Figure 8:
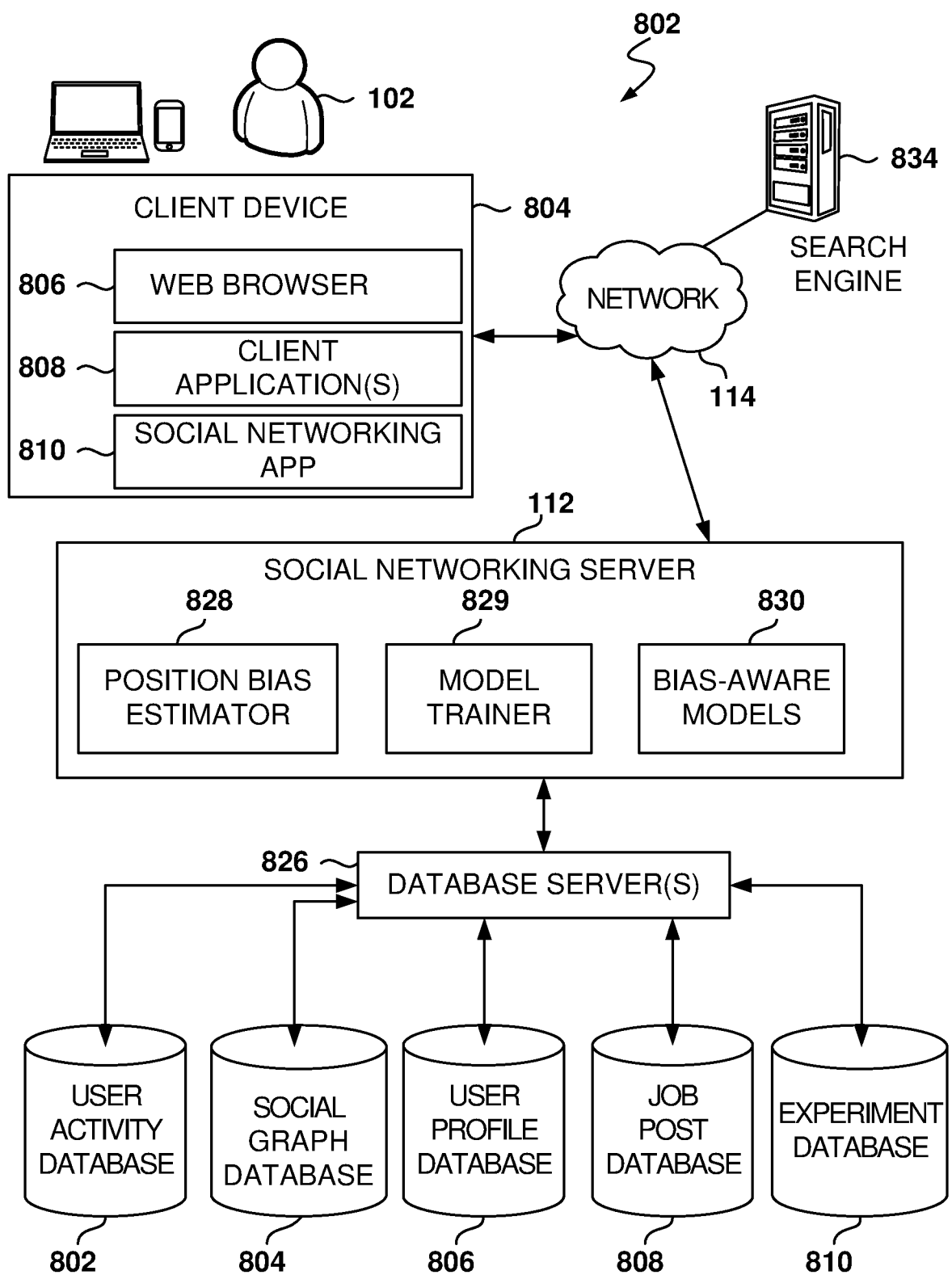
FIG. 8 is a block diagram illustrating a networked system, according to some example embodiments, including a social networking server, illustrating an example embodiment of a high-level client-server-based network architecture.

FIG. 8 is a block diagram illustrating a networked system, according to some example embodiments, including the social networking server 112, illustrating an example embodiment of a high-level client-server-based network architecture 802. Embodiments are presented with reference to an online service, and, in some example embodiments, the online service is a social networking service.

The social networking server 112, a distributed system comprising one or more machines, provides server-side functionality via a network 114 (e.g., the Internet or a wide area network (WAN)) to one or more client devices 804. FIG. 8 illustrates, for example, a client device 804 with a web browser 806, client application(s) 808, and a social networking app 810 executing on the client device 804. The social networking server 112 is further communicatively coupled with one or more database servers 826 that provide access to one or more databases 802, 804, 806, 808, and 810.

The social networking server 112 includes, among other modules, a position bias estimator 828, a model trainer 829, and bias-aware models 830. The position bias estimator 828 is a module for calculating the position bias. The model trainer 829 performs training for one or more models that produce the bias-aware models 830 for making estimates.

The client device 804 may comprise, but is not limited to, a mobile phone, a desktop computer, a laptop, a tablet, a netbook, a multi-processor system, a microprocessor-based or programmable consumer electronic system, or any other communication device that the user 102 may utilize to access the social networking server 112. In some embodiments, the client device 804 may comprise a display module (not shown) to display information (e.g., in the form of user interfaces).

In one embodiment, the social networking server 112 is a network-based appliance, or a distributed system with multiple machines, that responds to initialization requests or search queries from the client device 804. One or more users 102 may be a person, a machine, or other means of interacting with the client device 804. In various embodiments, the user 102 interacts with the network architecture 802 via the client device 804 or another means.

In some embodiments, if the social networking app 810 is present in the client device 804, then the social networking app 810 is configured to locally provide the user interface for the application and to communicate with the social networking server 112, on an as-needed basis, for data and/or processing capabilities not locally available (e.g., to access a user profile, to authenticate a user 102, to identify or locate other connected users 102, etc.). Conversely, if the social networking app 810 is not included in the client device 804, the client device 804 may use the web browser 806 to access the social networking server 112.

In addition to the client device 804, the social networking server 112 communicates with the one or more database servers 826 and databases. In one example embodiment, the social networking server 112 is communicatively coupled to the user activity database 802, a social graph database 804, a user profile database 806, a job-post database 808, and an experiment database 810 holding experiment data resulting from A/B testing of models. The databases may be implemented as one or more types of databases including, but not limited to, a hierarchical database, a relational database, a graph database, an object-oriented database, one or more flat files, or combinations thereof.

In some example embodiments, when a user 102 initially registers to become a user 102 of the social networking service provided by the social networking server 112, the user 102 is prompted to provide some personal information, such as name, age (e.g., birth date), gender, interests, contact information, home town, address, spouse's and/or family users' names, educational background (e.g., schools, majors, matriculation and/or graduation dates, etc.), employment history (e.g., companies worked at, periods of employment for the respective jobs, job title), professional industry (also referred to herein simply as "industry"), skills, professional organizations, and so on. This information is stored, for example, in the user profile database 806. Similarly, when a representative of an organization initially registers the organization with the social networking service provided by the social networking server 112, the representative may be prompted to provide certain information about the organization, such as a company industry.

While the database server(s) 826 are illustrated as a single block, one of ordinary skill in the art will recognize that the database server(s) 826 may include one or more such servers. Accordingly, and in one embodiment, the database server(s) 826 implemented by the social networking service are further configured to communicate with the social networking server 112.

The network architecture 802 may also include a search engine 834. Although only one search engine 834 is depicted, the network architecture 802 may include multiple search engines 834. Thus, the social networking server 112 may retrieve search results (and, potentially, other data) from multiple search engines 834. The search engine 834 may be a third-party search engine.

Figure 9:
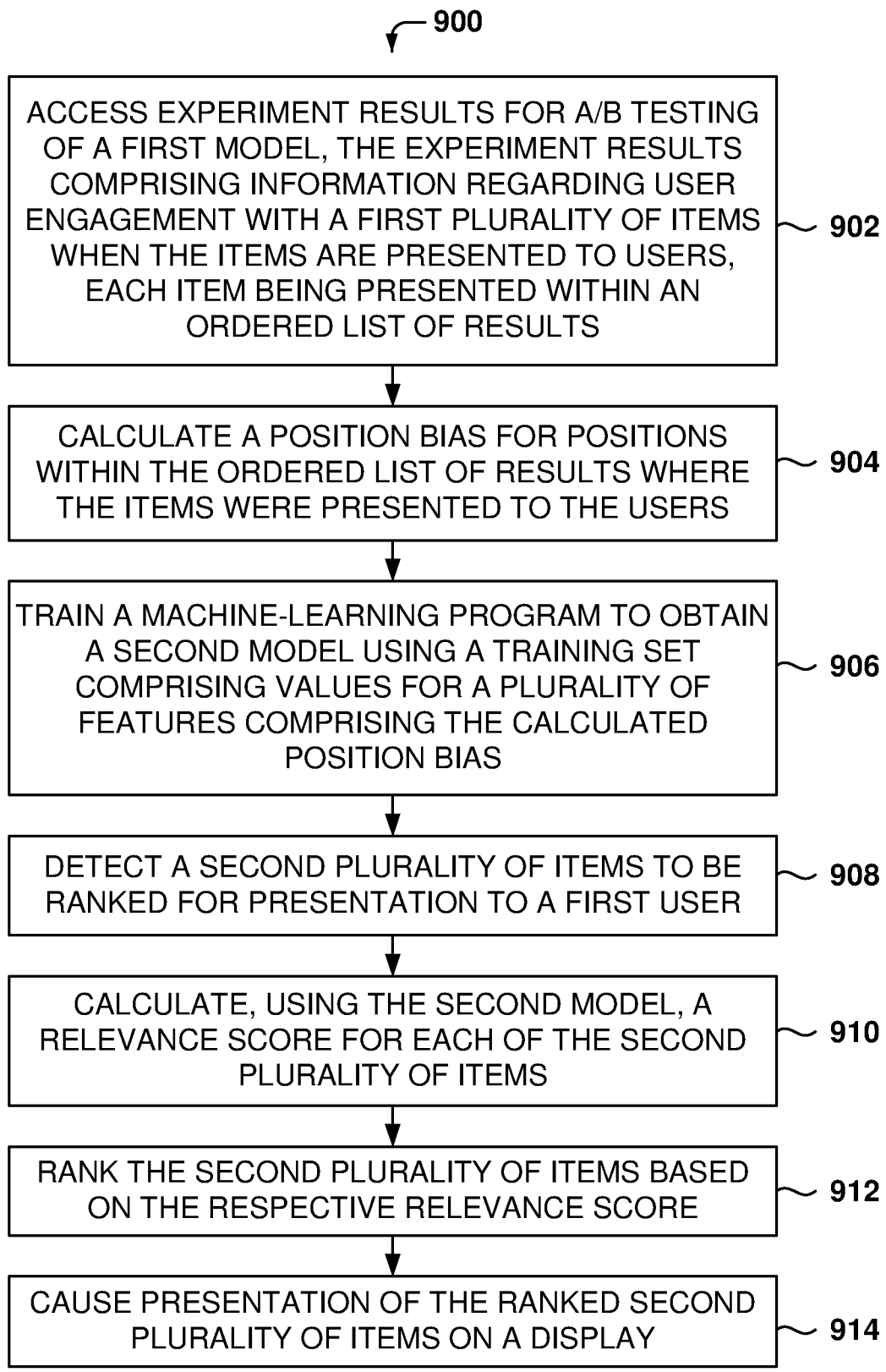
FIG. 9 is a flowchart of a method for eliminating bias while training an ML model using training data that includes past experimental data, according to some example embodiments.

FIG. 9 is a flowchart of a method 900 for eliminating bias while training an ML model using training data that includes past experimental data, according to some example embodiments.

Operation 902 is for accessing experiment results for A/B testing of a first model. The experiment results comprise information regarding user engagement with a first plurality of items when the items are presented to users, each item being presented within an ordered list of results.

From operation 902, the method 900 flows to operation 904 to calculate, based on the experiment results, a position bias for positions within the ordered list of results where the items were presented to the users.

From operation 904, the method 900 flows to operation 906 for training a machine-learning program to obtain a second model. The training uses a training set comprising values for a plurality of features, the plurality of features comprising the calculated position bias.

From operation 906, the method 900 flows to operation 908 for detecting a second plurality of items to be ranked for presentation to a first user.

From operation 908, the method 900 flows to operation 910 to calculate, using the second model, a relevance score for each of the second plurality of items.

From operation 910, the method 900 flows to operation 912 for ranking the second plurality of items based on the respective relevance score.

From operation 912, the method 900 flows to operation 914 for causing presentation of the ranked second plurality of items on a display.

In one example, calculating the position bias further includes utilizing an instrumental variables (IV) method to estimate an effect of feed position on responses of users utilizing an instrumental variable for a past experiment that affected item position.

In one example, the A/B testing affected positions of the first plurality of items, where requests in which an item was shown in different positions during the experiment are considered for calculating the position bias.

In one example, the position bias is a difference in expected performance of an item based on a location where the item is placed within the ordered list of results.

In one example, the first plurality of items includes candidate recommendations of people you may know (PYMK) for a viewing user, wherein the first model is for predicting a probability that one candidate will accept an invite from the viewing user.

In one example, the first plurality of items includes ads for placement on a user feed of a viewing user, wherein the first model is for A/B testing affected ad positions based on an ad-bidding procedure.

In one example, calculating the position bias further includes calculating a coefficient on experiment showing an impact of a bidding experiment for a plurality of ad campaigns, the coefficient-on-experiment reflecting an effect of the experiment on average positions of ads in a news feed.

In one example, the position bias is a difference in click-through rate for one ad when the ad is moved from a first position to a second position.

In one example, the A/B training includes testing a first version of the first model with a first group of users and testing a second version of the first model with a second group of users.

In one example, results obtained by the second model during operation are used to improve the training set and using the improved training set to generate a newer version of the second model.

In view of the disclosure above, various examples are set forth below. It should be noted that one or more features of an example, taken in isolation or combination, should be considered within the disclosure of this application.

Another general aspect is for a system that includes a memory comprising instructions and one or more computer processors. The instructions, when executed by the one or more computer processors, cause the one or more computer processors to perform operations comprising: accessing experiment results for A/B testing of a first model, the experiment results comprising information regarding user engagement with a first plurality of items when the items are presented to users, each item being presented within an ordered list of results; calculating, based on the experiment results, a position bias for positions within the ordered list of results where the items were presented to the users; training a machine-learning program to obtain a second model, the training using a training set comprising values for a plurality of features, the plurality of features comprising the calculated position bias; detecting a second plurality of items to be ranked for presentation to a first user; calculating, using the second model, a relevance score for each of the second plurality of items; ranking the second plurality of items based on the respective relevance score; and causing presentation of the ranked second plurality of items on a display.

In yet another general aspect, a tangible machine-readable storage medium (e.g., a non-transitory storage medium) includes instructions that, when executed by a machine, cause the machine to perform operations comprising: accessing experiment results for A/B testing of a first model, the experiment results comprising information regarding user engagement with a first plurality of items when the items are presented to users, each item being presented within an ordered list of results; calculating, based on the experiment results, a position bias for positions within the ordered list of results where the items were presented to the users; training a machine-learning program to obtain a second model, the training using a training set comprising values for a plurality of features, the plurality of features comprising the calculated position bias; detecting a second plurality of items to be ranked for presentation to a first user; calculating, using the second model, a relevance score for each of the second plurality of items; ranking the second plurality of items based on the respective relevance score; and causing presentation of the ranked second plurality of items on a display.

Figure 10:
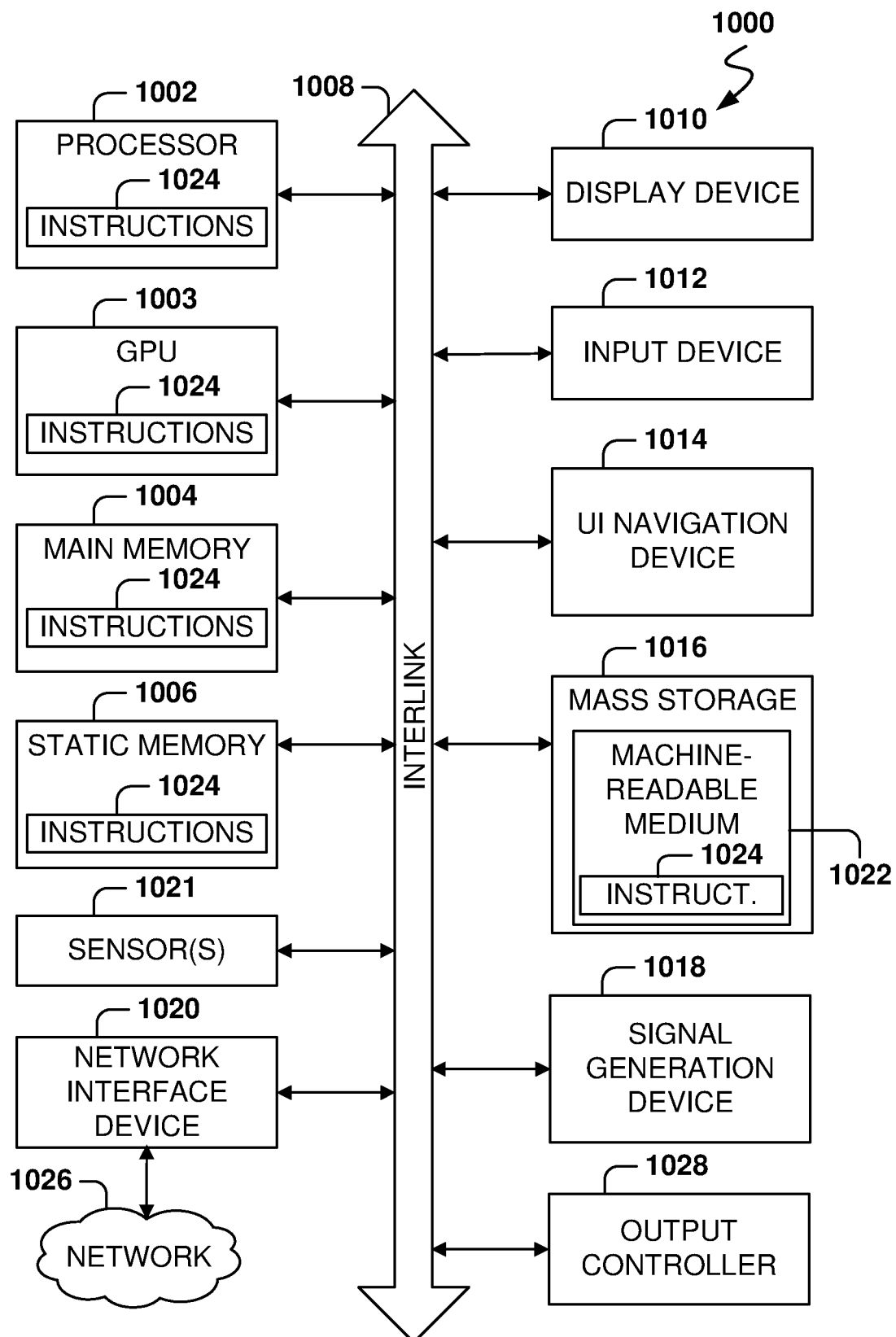
FIG. 10 is a block diagram illustrating an example of a machine 900 upon or by which one or more example process embodiments described herein may be implemented or controlled.

FIG. 10 is a block diagram illustrating an example of a machine 1000 upon or by which one or more example process embodiments described herein may be implemented or controlled. In alternative embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in a peer-to-peer (P2P) (or other distributed) network environment. Further, while only a single machine 1000 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, a number of components, or mechanisms. Circuitry is a collection of circuits implemented in tangible entities that include hardware (e.g., simple circuits, gates, logic). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits) including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 1000 may include a hardware processor 1002 (e.g., a central processing unit (CPU), a hardware processor core, or any combination thereof), a graphics processing unit (GPU) 1003, a main memory 1004, and a static memory 1006, some or all of which may communicate with each other via an interlink (e.g., bus) 1008. The machine 1000 may further include a display device 1010, an alphanumeric input device 1012 (e.g., a keyboard), and a user interface (UI) navigation device 1014 (e.g., a mouse). In an example, the display device 1010, alphanumeric input device 1012, and UI navigation device 1014 may be a touch screen display. The machine 1000 may additionally include a mass storage device (e.g., drive unit) 1016, a signal generation device 1018 (e.g., a speaker), a network interface device 1020, and one or more sensors 1021, such as a Global Positioning System (GPS) sensor, compass, accelerometer, or another sensor. The machine 1000 may include an output controller 1028, such as a serial (e.g., universal serial bus (USB)), parallel, or other wired or wireless (e.g., infrared (IR), near field communication (NFC)) connection to communicate with or control one or more peripheral devices (e.g., a printer, card reader).

The mass storage device 1016 may include a machine-readable medium 1022 on which is stored one or more sets of data structures or instructions 1024 (e.g., software) embodying or utilized by any one or more of the techniques or functions described herein. The instructions 1024 may also reside, completely or at least partially, within the main memory 1004, within the static memory 1006, within the hardware processor 1002, or within the GPU 1003 during execution thereof by the machine 1000. In an example, one or any combination of the hardware processor 1002, the GPU 1003, the main memory 1004, the static memory 1006, or the mass storage device 1016 may constitute machine-readable media.

While the machine-readable medium 1022 is illustrated as a single medium, the term "machine-readable medium" may include a single medium, or multiple media, (e.g., a centralized or distributed database, and/or associated caches and servers) configured to store the one or more instructions 1024.

The term "machine-readable medium" may include any medium that is capable of storing, encoding, or carrying instructions 1024 for execution by the machine 1000 and that cause the machine 1000 to perform any one or more of the techniques of the present disclosure, or that is capable of storing, encoding, or carrying data structures used by or associated with such instructions 1024. Non-limiting machine-readable medium examples may include solid-state memories, and optical and magnetic media. In an example, a massed machine-readable medium comprises a machine-readable medium 1022 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1024 may further be transmitted or received over a communications network 1026 using a transmission medium via the network interface device 1020.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Additionally, as used in this disclosure, phrases of the form "at least one of an A, a B, or a C," "at least one of A, B, and C," and the like, should be interpreted to select at least one from the group that comprises "A, B, and C." Unless explicitly stated otherwise in connection with a particular instance, in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
    collecting a set of items from a database;
    causing a first presentation of a first plurality of the set of items on a display feed of a website, the first plurality of items including a first item;
    applying a transformation to one or more of the items including the first item, wherein applying the transformation to an item includes repositioning the respective item on the display feed;
    creating a first training set comprising accessed experiment results for A/B testing of an update to a first model, the experiment results comprising information regarding user engagement with the first plurality of the set of items when the first plurality of the set of items is presented to users, each item being presented within an ordered list of results on the display feed of the website, wherein the first item has a first position in the display feed that changes during A/B testing;
    using the first training set, calculating, based on the experiment results, a position bias for positions within the ordered list of results;
    creating a second training set comprising the calculated position biases;
    training a machine-learning program using the second training set to obtain a second model having positionally debiased outputs;
    detecting a second plurality of items to be ranked for presentation to a first user, the second plurality of items comprising the first item;
    calculating, using the second model, a relevance score for each of the second plurality of items;
    ranking the second plurality of items based on the respective relevance score; and
    causing a second presentation of the ranked second plurality of items on the display feed of the website, wherein a second position of the first item in the second presentation changes from the first position in the first presentation based in part on the positionally debiased outputs of the second model.

2. The method as recited in claim 1, wherein calculating the position bias further includes:
    utilizing an instrumental variables (IV) method to estimate an effect of feed position on responses of users utilizing an instrumental variable for a past experiment that affected item position.

3. The method as recited in claim 2, wherein the A/B testing affected positions of the first plurality of items, wherein requests in which an item was shown in different positions during the experiment are considered for calculating the position bias.

4. The method as recited in claim 1, wherein the position bias is a difference in expected performance of an item based on a location where the item is placed within the ordered list of results.

5. The method as recited in claim 1, wherein the first plurality of items includes candidate recommendations of people you may know (PYMK) for a viewing user, wherein the first model is for predicting a probability that one candidate will accept an invite from the viewing user.

6. The method as recited in claim 1, wherein the first plurality of items includes ads for placement on a user feed of a viewing user, wherein the first model is for A/B testing affected ad positions based on an ad-bidding procedure.

7. The method as recited in claim 6, wherein calculating the position bias further includes:
    calculating a coefficient on experiment showing an impact of a bidding experiment for a plurality of ad campaigns, the coefficient-on-experiment reflecting an effect of the experiment on average positions of ads in a news feed.

8. The method as recited in claim 6, wherein the position bias is a difference in click-through rate for one ad when the ad is moved from a first position to a second position.

9. The method as recited in claim 1, wherein A/B training includes testing a first version of the first model with a first group of users and testing a second version of the first model with a second group of users.

10. The method as recited in claim 1, wherein results obtained by the second model during operation are used to improve the training set and using the improved training set to generate a newer version of the second model.

11. A system comprising:
    a memory comprising instructions; and
    one or more computer processors, wherein the instructions, when executed by the one or more computer processors, cause the system to perform operations comprising:
        collecting a set of items from a database;
        causing a first presentation of a first plurality of the set of items on a display feed of a website, the first plurality of items including a first item;
        applying a transformation to one or more of the items including the first item, wherein applying the transformation to an item includes repositioning the respective item on the display feed;
        creating a first training set comprising accessed experiment results for A/B testing of an update to a first model, the experiment results comprising information regarding user engagement with the first plurality of the set of items when the first plurality of the set of items is presented to users, each item being presented within an ordered list of results on the display feed of the website, wherein the first item has a first position in the display feed that changes during A/B testing;
        using the first training set, calculating, based on the experiment results, a position bias for positions within the ordered list of results;
        creating a second training set comprising the calculated position biases;
        training a machine-learning program using the second training set to obtain a second model having positionally debiased outputs;
        detecting a second plurality of items to be ranked for presentation to a first user, the second plurality of items comprising the first item;
        calculating, using the second model, a relevance score for each of the second plurality of items;
        ranking the second plurality of items based on the respective relevance score; and
        causing a second presentation of the ranked second plurality of items on the display feed of the website, wherein a second position of the first item in the second presentation changes from the first position in the first presentation based in part on the positionally debiased outputs of the second model.

12. The system as recited in claim 11, wherein calculating the position bias further includes:
    utilizing an instrumental variables (IV) method to estimate an effect of feed position on responses of users utilizing an instrumental variable for a past experiment that affected item position.

13. The system as recited in claim 12, wherein the A/B testing affected positions of the first plurality of items, wherein requests in which an item was shown in different positions during the experiment are considered for calculating the position bias.

14. The system as recited in claim 11, wherein the position bias is a difference in expected performance of an item based on a location where the item is placed within the ordered list of results.

15. The system as recited in claim 11, wherein the first plurality of items includes candidate recommendations of people you may know (PYMK) for a viewing user, wherein the first model is for predicting a probability that one candidate will accept an invite from the viewing user.

16. A tangible non-transitory machine-readable storage medium including instructions that, when executed by a machine, cause the machine to perform operations comprising:
collecting a set of items from a database;
causing a first presentation of a first plurality of the set of items on a display feed of a website, the first plurality of items including a first item;
applying a transformation to one or more of the items including the first item, wherein applying the transformation to an item includes repositioning the respective item on the display feed;
creating a first training set comprising accessed experiment results for A/B testing of an update to a first model, the experiment results comprising information regarding user engagement with the first plurality of the set of items when the first plurality of the set of items is presented to users, each item being presented within an ordered list of results on the display feed of the website, wherein the first item has a first position in the display feed that changes during A/B testing;
using the first training set, calculating, based on the experiment results, a position bias for positions within the ordered list of results;
creating a second training set comprising the calculated position biases;
training a machine-learning program using the second training set to obtain a second model having positionally debiased outputs;
detecting a second plurality of items to be ranked for presentation to a first user, the second plurality of items comprising the first item;
calculating, using the second model, a relevance score for each of the second plurality of items;
ranking the second plurality of items based on the respective relevance score; and
causing a second presentation of the ranked second plurality of items on the display feed of the website, wherein a second position of the first item in the second presentation changes from the first position in the first presentation based in part on the positionally debiased outputs of the second model.

17. The tangible non-transitory machine-readable storage medium as recited in claim 16, wherein calculating the position bias further includes:
utilizing an instrumental variables (IV) method to estimate an effect of feed position on responses of users utilizing an instrumental variable for a past experiment that affected item position.

18. The tangible non-transitory machine-readable storage medium as recited in claim 17, wherein the A/B testing affected positions of the first plurality of items, wherein requests in which an item was shown in different positions during the experiment are considered for calculating the position bias.

19. The tangible non-transitory machine-readable storage medium as recited in claim 16, wherein the position bias is a difference in expected performance of an item based on a location where the item is placed within the ordered list of results.

20. The tangible machine-readable storage medium as recited in claim 16, wherein the first plurality of items includes candidate recommendations of people you may know (PYMK) for a viewing user, wherein the first model is for predicting a probability that one candidate will accept an invite from the viewing user.

* * * * *